United States Patent Office 2,970,880
Patented Feb. 7, 1961

2,970,880

SOLUBLE VAT DYE PRINTING COMPOSITIONS WITH HETEROCYCLIC SOLUBILIZING AGENTS

Earl Kaplan, North Plainfield, and Isaiah Von, Plainfield, N.J., assignors to American Cyanamid Company, New York, N.Y., a corporation of Maine No Drawing. Filed June 10, 1958, Ser. No. 741,011

10 Claims. (Cl. 8—70)

This invention relates to improved soluble vat dye printing compositions, and more specifically, it relates to improved soluble vat dye printing compositions containing heterocyclic polymers as solubilizing agents. More specifically, it relates to soluble vat dye printing compositions comprising sulfuric acid ester salts of leuco vat dyes and more than 0.35 part, per part of said ester salt, of either a polymer of 1,3-bis-hydroxymethyl-2-imidazolone having a molecular weight greater than 200 or a polymer of N-vinylpyrrolidone having a molecular weight of 20,000 to 40,000.

The soluble vat dyes are a class of dyestuffs in which ordinary vat dyes are converted to their leucos and subsequently converted to sulfuric acid ester salts of these leucos. Their most important application is in the printing on textiles. In such an application, a soluble vat dye paste is made which contains the necessary components for a suitable printing gum. Certain disadvantages are observed however in printing with soluble vat dyes. There is a tendency, especially in the case of the sulfuric ester salts of certain vat dyes, for the ester salt to crystallize out of the print gum on standing. Such crystallization spoils the homogeneity of the print gum and the result is that when the gum is used in printing a design the print is specked with points at which more of the dye has been applied than in others. These points are those at which crystals of the leuco ester have been deposited. The success of a soluble vat dye print is very much dependent like any other dye on the achievement of a uniform color. Consequently, any tendency toward specking due to crystallization is a distinct disadvantage in such use.

We have found that the incorporation into the soluble vat dye printing gum composition of certain additives as solubilizing agents prevents the crystallization of the dye and consequently, permits quite uniform level, non-specky prints. The solubilizing agents to be used are polymers of 1,3-bis-hydroxymethyl-2-imidazolone, and polymers of N-vinylpyrrolidone as described below.

Of the solubilizing agents which are used in the compositions of our invention, one, namely poly-N-vinylpyrrolidone is a familiar article of commerce. Its molecular weight ranges from 20,000 to 40,000, although polymers having a molecular weight of about 40,000 are preferred in our compositions. The other solubilizing agent which we use in a polymer of 1,3-bis-hydroxymethyl-2-imidazolone. The polymer must be at least a dimer, that is, have a molecular weight greater than 200, although a molecular weight of about 500, that is approximately a pentamer is preferred. Such a compound may be illustrated by the following structural formula:

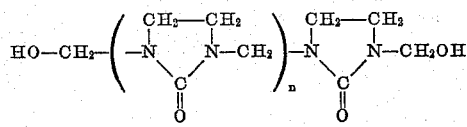

in which $n$ is greater than zero. Such compounds are prepared by the condensation of formaldehyde, with ethyleneurea to form dimethanolethylene urea or more correctly, 1,3-bis-hydroxymethyl-2-imidazolone. This is then polymerized (or more correctly self-condensed) in aqueous solution by heating with acid. The polymerization of these compounds is described in the copending application of Kaplan and Morath, Serial No. 737,983, filed May 26, 1958, and is illustrated in one of the examples of this application.

The dyes which can be used to form the printing compositions include specifically the disulfuric ester of 2,3,7,8-dibenzpyrene-1,6-quinone, the disulfuric ester of leuco 4,4',5,5'-dibenzothioindigo and the leuco sulfuric ester of 1(S),2(N),5(S),6(N)-bis-2-phenylthiazolyl-anthraquinone. Other soluble vat dyes which can be used in our compositions can be found described in "The Chemistry of Synthetic Dyes," by Venkataraman, Academic Press, 1952, pages 1046–1058, and "The Chemistry of Snythetic Dyes and Pigments," H. A. Lubs, Reinhold Publishing Corp., 1955, pages 534–548. Our invention contemplates the use of solubilizing agents with any of the soluble vat dyes described therein and not merely with the specific ones shown above.

The essential ingredients in the compositions of our invention are the polymer solubilizing agents and the soluble vat dye, or leuco sulfuric ester of a vat dye. However, any of the other ordinary components of a vat printing gum may be added as needed to form a proper printing gum. Examples of such materials as ordinarily used in the art are urea, thiodiethylene glycol, ammonium hydroxide, sodium chlorate, ammonium metavanadate, water, starch, gluconic acid, and the like. Other materials used in such compositions are described in Venkataraman's book (vide supra), pages 1055–1058, and in "The Chemical Technology of Dyeing and Printing," by Dieserens, Reinhold, 1948.

The compositions of our invention require that at least 0.35 part of the solubilizing agent per part of leuco sulfuric acid ester salt calculated as the real oxidized vat dye be used. Larger proportions are of course usable, but as in any composition for commercial use, it is normally not customary to use more than is absolutely necessary for economic reasons.

In making up the formulations, the additive may be added to the dyestuff in presscake form or to the dried powder or at any stage in the blending operation for the manufacture of the printing gum with equally good results.

Our invention can be illustrated by the following examples in which parts are by weight unless specified.

*Example 1*

A mixture of 1 part of the sodium salt of disulfuric acid ester of 2,3,7,8-dibenzpyrene-1,6-quinone (Soluble Vat Golden Yellow GK), 1 part of urea and 1 part of thiodiethylene glycol (HOCH$_2$CH$_2$SCH$_2$CH$_2$OH) is pasted to a smooth slurry and 11.1 parts of boiling water is then added. The mixture is completely dissolved, 16.7 parts of a starch gum paste is added and the entire mixture is then stirred to a smooth paste. Finally there are added 1 part of 25% aqueous sodium chlorate solution, ½ part of 29% ammonium hydroxide solution, ½ part of gluconic acid, and ½ part of 1% aqueous ammonium metavanadate. The whole mixture is stirred to a smooth paste.

On standing at room temperature a portion of the dye had crystallized after 1 hour and the dye was completely precipitated after 2 hours. Prints resulting from the use of this printing gum were very specky and uneven.

*Example 2*

A print gum is made up by following the procedure described in Example 1, except that 0.35 part of polyvinylpyrrolidone (molecular weight about 40,000) is added along with dyestuff. After standing for at least 4 hours, no crystallization of the dye had taken place. Prints from this gum are quite level.

Example 3

A mixture of 288 g. of 50% aqueous solution of dimethylolethyleneurea monomer, 1,3-bis-hydroxymethyl-2-imidazolone and 6 parts of concentrated hydrochloric acid is heated to 90° C. over a 1 hour period. After holding 1½ hours at 90–95° C. the solution is gradually cooled to room temperature and then neutralized with NaOH. The water is then removed by drying in an oven at 100° C., leaving a residue of polymeric material. This polymeric dimethylolethyleneurea is used in a number of the examples which follow.

The polymer is estimated by cryoscopic measurement to have about 3.5 to 4 units per molecule with a molecular weight in the neighborhood of 360.

Example 4

A printing gum is made following the procedure described in Example 1, except that 0.5 part of a dimethylolethyleneurea polymer (prepared by the procedure of Example 3) having a molecular weight of approximately 300 is added together with the dyestuff. After standing for 24 hours, no crystallization of dye had taken place from the print gum. Prints resulting from the use of this gum were level, uniform and non-specky.

Example 5

A print gum is prepared according to the procedure of Example 3, except that a dimethylolethyleneurea polymer with a molecular weight of approximately 2,000 (prepared by heating the dried polymer of Example 3 in an atmosphere of hydrogen chloride) is used. No crystallization of dye was observed after the gum had stood for 24 hours.

Example 6

A print gum is prepared using the procedure described in Example 1, except that the sodium salt of the disulfuric acid ester of leuco 4,4',5,5'-dibenzthioindigo (Soluble Vat Brown RR) is used as the dyestuff. After standing for 5 minutes crystallization of the dye from the print gum composition had started.

Example 7

A printing gum is made up according to the procedure of Example 6, except that 1 part of a dimethylolethyleneurea polymer having a molecular weight of approximately 500 is added to the composition with the dyestuff. After standing for 72 hours, no crystallization of dyestuff from the gum composition could be observed.

Example 8

The procedure of Example 7 is followed using the sodium salt of the disulfuric acid ester of 1(S),2(N), 5(S),6(N)-bis-(2-phenylthiazolo) anthraquinone (Soluble Vat Yellow GC) in place of the dye of that example. The resulting gum is stable for a long period.

We claim:

1. A soluble vat dye printing composition comprising a sulfuric acid ester salt of a leuco vat dye and more than 0.35 part, per part of said ester salt, of a compound chosen from the group consisting of (1) polymers of 1,3-bis-hydroxymethyl-2-imidazolone having a molecular weight greater than 200, and (2) polymers of N-vinylpyrrolidone having a molecular weight of 20,000 to 40,000.

2. The printing compositions of claim 1 in which the said sulfuric acid ester salts are the salts of disulfuric acid esters of vat dyes chosen from the group consisting of 2,3,7,8-dibenzpyrene-1,6-quinone, 4,4',5,5'-dibenzothioindigo and 1(S),2(N),5(S),6(N)-bis-2-phenylthiazolo-anthraquinone.

3. The compositions of claim 2 in which the solubilizing agent is a polymer of 1,3-bis-hydroxymethyl-2-imidazolone having a molecular weight greater than 200.

4. The compositions of claim 3 in which the molecular weight is about 300 to 500.

5. The compositions of claim 4 in which the soluble vat dye is the sodium salt of the disulfuric acid ester of leuco 2,3,7,8-dibenzpyrene-1,6-quinone.

6. The compositions of claim 4 in which the soluble vat dye is the sodium salt of the disulfuric acid ester of leuco 4,4',5,5'-dibenzthioindigo.

7. The compositions of claim 2 in hich the solubilizing agent is a polymer of N-vinylpyrrolidone having a molecular weight of 20,000 to 40,000.

8. The compositions of claim 7 in which the molecular weight is about 40,000.

9. The compositions of claim 8 in which the dye is the sodium salt of the disulfuric acid ester of leuco 2,3,7,8-dibenzpyrene-1,6-quinone.

10. The compositions of claim 8 in which the soluble vat dye is the sodium salt of the disulfuric acid ester of leuco 4,4',5,5',-dibenzthioindigo.

References Cited in the file of this patent

UNITED STATES PATENTS

| | | |
|---|---|---|
| 2,265,450 | Reppe | Dec. 9, 1941 |
| 2,903,325 | Geigy | Sept. 8, 1959 |

OTHER REFERENCES

Luttringhaus: Am. Dyestuff Rep., February 21, 1949, pp. 172–173.

Hansen: Am. Dyestuff Rep., February 1, 1954, pp. 72–75.

Holmes: Am. Dyestuff Rep., September 26, 1955, pp. 702–704.